(12) United States Patent
Veillon

(10) Patent No.: US 10,883,943 B2
(45) Date of Patent: Jan. 5, 2021

(54) METHOD AND APPARATUS FOR DETECTING A CRACK IN A TRANSPARENT ARTICLE

(71) Applicant: GlaxoSmithKline Biologicals S.A., Rixensart (BE)

(72) Inventor: Romain Marie Veillon, Wavre (BE)

(73) Assignee: GLAXOSMITHKLINE BIOLOGICALS SA, Rixensart (BE)

( * ) Notice: Subject to any disclaimer, the term of this patent is extended or adjusted under 35 U.S.C. 154(b) by 23 days.

(21) Appl. No.: 16/074,900

(22) PCT Filed: Feb. 1, 2017

(86) PCT No.: PCT/EP2017/052117
§ 371 (c)(1),
(2) Date: Aug. 2, 2018

(87) PCT Pub. No.: WO2017/134086
PCT Pub. Date: Aug. 10, 2017

(65) Prior Publication Data
US 2019/0049390 A1    Feb. 14, 2019

(30) Foreign Application Priority Data
Feb. 3, 2016 (GB) .................................. 1601960.6

(51) Int. Cl.
*G01N 21/88*        (2006.01)
*G01N 21/90*        (2006.01)

(52) U.S. Cl.
CPC ......... *G01N 21/8806* (2013.01); *G01N 21/90* (2013.01); *G01N 2021/8848* (2013.01)

(58) Field of Classification Search
CPC combination set(s) only.
See application file for complete search history.

(56) References Cited

U.S. PATENT DOCUMENTS 3,811,775 A * 5/1974 Abu-Saud ............... G01L 1/241
356/35
3,963,348 A * 6/1976 Nakatani .............. G01B 11/168
356/33

(Continued)

FOREIGN PATENT DOCUMENTS

| JP | H10332533 A | 12/1998 |
|----|---|---|
| WO | 97/46329 A1 | 12/1997 |
| WO | 2015/099001 A1 | 7/2015 |

*Primary Examiner* — Mohamed K Amara
(74) *Attorney, Agent, or Firm* — Birch, Stewart, Kolasch & Birch, LLP

(57) ABSTRACT

Apparatus for detecting cracks in optically transparent articles e.g vials, comprising a mount for the article, a light source to direct light at a mounted article, an optical detector positioned to receive light from the light source passed through the article and to generate an electronic signal responsive to received light, first and second (analyzer) polarizers such that light from the light source passes through the first polarizer then through the article, then through the second polarizer on its path to the optical detector, with an optical wave plate positioned between the mount and the second polarizer, and an image processing system to process the electronic signal generated by the optical detector and to indicate the presence or absence of a crack in the article supported on the mount. A method of crack detection using the apparatus is also provided.

13 Claims, 3 Drawing Sheets

(56) References Cited

U.S. PATENT DOCUMENTS

| | | | | |
|---|---|---|---|---|
| 4,040,748 A * | 8/1977 | Belleson | G01B 11/002 | 356/431 |
| 4,280,624 A * | 7/1981 | Ford | B07C 5/126 | 209/524 |
| 4,547,067 A | 10/1985 | Watanabe | | |
| 4,668,086 A | 5/1987 | Redner | | |
| 4,831,274 A * | 5/1989 | Kohno | G01N 21/94 | 250/559.39 |
| 4,900,916 A * | 2/1990 | Cormack | G01N 21/9018 | 250/223 B |
| 4,902,137 A * | 2/1990 | Krieg | G01N 21/9027 | 250/223 B |
| 4,908,507 A * | 3/1990 | Imre | G01N 21/90 | 250/223 B |
| 4,919,534 A * | 4/1990 | Reed | B07C 5/3416 | 209/524 |
| 5,072,128 A * | 12/1991 | Hayano | G01N 21/94 | 250/226 |
| 5,266,806 A * | 11/1993 | Barber | G01N 21/88 | 250/341.4 |
| 5,305,081 A * | 4/1994 | Gooch | G01L 1/24 | 250/223 B |
| 5,305,090 A * | 4/1994 | Kowalski | G01N 21/8803 | 356/365 |
| 5,365,084 A * | 11/1994 | Cochran | G01N 21/8901 | 250/226 |
| 5,375,012 A * | 12/1994 | Borrelli | C03C 4/06 | 359/486.03 |
| 5,448,350 A * | 9/1995 | Kohno | G01N 21/94 | 250/559.42 |
| 5,491,117 A * | 2/1996 | Kerko | C03C 3/11 | 501/13 |
| 5,695,039 A * | 12/1997 | Driscoll | G01N 21/21 | 194/212 |
| 5,717,198 A * | 2/1998 | Broude | G01N 21/94 | 250/205 |
| 5,969,810 A * | 10/1999 | Nicks | G01N 21/9036 | 356/239.4 |
| 6,067,155 A * | 5/2000 | Ringlien | G01N 21/21 | 250/208.1 |
| 6,133,999 A * | 10/2000 | Myers | G01B 11/06 | 356/239.4 |
| 6,208,750 B1 * | 3/2001 | Tsadka | G01N 21/94 | 250/559.18 |
| 6,239,870 B1 * | 5/2001 | Heuft | G01N 21/90 | 250/223 B |
| 6,370,407 B1 * | 4/2002 | Kroeger | A61B 5/14558 | 600/316 |
| 6,657,714 B2 * | 12/2003 | Almogy | G01N 21/9501 | 356/237.3 |
| 6,731,383 B2 * | 5/2004 | Watkins | G01N 21/9501 | 355/67 |
| 6,773,935 B2 * | 8/2004 | Watkins | G01N 21/9501 | 257/283 |
| 6,882,415 B1 * | 4/2005 | Watkins | G01N 21/956 | 356/237.2 |
| 6,970,287 B1 * | 11/2005 | Watkins | G01N 21/956 | 356/237.4 |
| 7,256,884 B2 * | 8/2007 | Kim | G01N 21/94 | 356/239.8 |
| 7,705,985 B2 * | 4/2010 | Lucas | G01N 21/21 | 356/367 |
| 8,149,396 B2 * | 4/2012 | Hamamatsu | G01N 21/9501 | 356/237.1 |
| 8,912,495 B2 * | 12/2014 | Lange | G01N 21/3563 | 250/338.1 |
| 9,518,916 B1 * | 12/2016 | Pandev | G01N 21/255 | |
| 9,733,196 B2 * | 8/2017 | Lee | G01N 21/94 | |
| 10,436,936 B2 * | 10/2019 | Mestieri | G01S 7/4802 | |
| 2002/0089664 A1 * | 7/2002 | Shibata | G01N 21/9501 | 356/237.2 |
| 2005/0018201 A1 * | 1/2005 | de Boer | G01B 9/02079 | 356/479 |
| 2006/0122050 A1 * | 6/2006 | Borrelli | C03C 4/06 | 501/56 |
| 2011/0310244 A1 * | 12/2011 | Schweitzer | G01N 21/896 | 348/92 |
| 2015/0046121 A1 * | 2/2015 | Dziura | G01N 21/9501 | 702/179 |
| 2017/0363472 A1 * | 12/2017 | Abdulhalim | G01J 3/2823 | |

* cited by examiner

METHOD AND APPARATUS FOR DETECTING A CRACK IN A TRANSPARENT ARTICLE

CROSS-REFERENCE TO RELATED APPLICATIONS

This application is filed pursuant to 35 U.S.C. § 371 as a United States National Phase Application of International Application No. PCT/EP2017/052117 filed 1 Feb. 2017 which claims priority from GB 1601960.6 filed 3 Feb. 2016.

FIELD OF THE INVENTION

This invention relates to apparatus and methods for crack detection, in particular for detection of cracks in transparent articles, especially containers for medicinal products such as transparent vials, syringe barrels, ampoules and the like.

BACKGROUND TO THE INVENTION

In the field of medicinal products, e.g. pharmaceuticals and vaccines, such products are frequently supplied in containers such as transparent vials, syringe barrels, ampoules and the like. Typical transparent materials of which such containers are made include glass and transparent polymers such as polystyrene, polycarbonate and COC polymers.

Cracks in such containers can result among other things in loss of integrity, leakage of the contents of the container and/or contamination of the contents of the container. The term "crack" herein relates to any fissure in the material of the article that penetrates the thickness of the material partly or entirely through the article, e.g. partly or entirely through the thickness of the wall of a container from either the exterior or interior. It is therefore highly desirable that such containers are crack-free, and that any cracks in such containers are detected as early as possible, preferably before the container is filled. It is in fact a requirement of many health authorities that suppliers of such medicinal products have adequate quality control procedures to ensure that as far as possible such containers are 100% crack-free, albeit recognizing that crack detection remains probabilistic.

Apparatus and methods for crack detection are known. These often rely upon optical camera imaging. Optical apparatus and methods are known for detecting stress in transparent materials. Such apparatus and methods are for example disclosed in WO-A-2010/142718. US-A-2005/0117149 discloses an apparatus and method for crack detection in ampoules, bottles and the like as used in the pharmaceutical industry based on optical methods.

It is also known to use optical polarimetry to detect and analyse strain in glass, see for example ASTM publication F218-95 (2000) "Standard Test Method for Analyzing Stress in Glass" (2000). Such polarimetry strain detection methods are based on the so called "photoelasticity" effect that stress applied to a transparent material can cause the transparent material to become birefringent, i.e. the optical property of the material having a refractive index that depends inter alia on the polarization of light passing through the transparent material. In effect a birefringent material acts to resolve incoming light into differently polarized components and retards the different components depending upon their direction of polarization. If such a transparent material is placed between two polarizing plates, i.e. a polarizer and an analyser, and light is passed through the polarizer, the stressed material and the analyzer in sequence, colour patterns become visible in the image formed in light passing through the material due to interference effects because of the retardation of the wave phases of the polarization components. Structural stress in such transparent materials is signified at locations where there is a large concentration of coloured bands in the image. This location of stress is usually the location where structural failure will most likely occur, although stress may also be projected into other locations, for example stress in the neck of a vial may cause consequential stress in the side wall of a vial. A crack may introduce stress and consequently birefringence into a transparent material, but equally well a crack may relieve stress in the material. To date such polarimetry techniques have not been used in crack detection.

There is still a problem of improving current methods of detection of cracks in the above-mentioned transparent containers such as vials, syringe barrels and ampoules. For example the accuracy of these methods could be improved. Also there is a need for an apparatus and method which can detect cracks in such containers as vials, syringe barrels and ampoules at a speed commensurate with the speed at which such containers are made or filled, which for example in the case of vials can for example be typically up to ca. 36,000 an hour (600 per minute).

It is an object of this invention to provide an improved apparatus and method for detecting cracks in such containers, addressing the above-mentioned problems at least in part. Other objects and advantages of the present invention will be apparent from the following description.

SUMMARY OF THE INVENTION

According to a first aspect of this invention an apparatus for detecting a crack in an optically transparent article comprises:

a mount to support one or more optically transparent article;

a light source positioned to direct a beam of incident light at an optically transparent article when supported on the mount;

an optical detector positioned to receive light from the light source which has passed through an optically transparent article when supported on the mount and to generate an electronic signal responsive to such received light;

a first polarizer positioned between the light source and the mount such that incident light from the light source passes through the first polarizer on its path to an article supported by the mount;

a second polarizer (analyzer) positioned between the mount and the optical detector such that incident light from the light source which has passed through the first polarizer and an article supported by the mount passes through the second polarizer on its path to the optical detector;

an optical wave plate positioned between the mount and the second polarizer such that incident light from the light source which has passed through the first polarizer and a transparent article supported by the mount passes through the wave plate on its path to the second polarizer and the optical detector;

an image processing system to process the electronic signal generated by the optical detector in response the light received by the optical detector and to thereby generate an indication to a user of the presence or absence of a crack in a transparent article supported on the mount.

According to a second aspect of this invention a method for checking an optically transparent article for the presence of a crack comprises:

supporting such an article on a mount, directing incident light from a light source through a first polarizer positioned between the light source and the article such that the incident light from the light source becomes polarized light, passing said polarized light through the article, passing said polarized light which has passed through the article through a wave plate, passing said polarized light which has passed through the wave plate through a second polarizer, using an optical detector to detect an image caused by birefringence resulting from stress in the transparent material in said polarized light which has passed through the second polarizer, generating an electronic signal responsive to the image, using an image processing system to process the electronic signal related to the image to provide an indication to a user of the presence or absence of a crack in the transparent article.

DETAILED DESCRIPTION OF THE INVENTION

Figure 1:
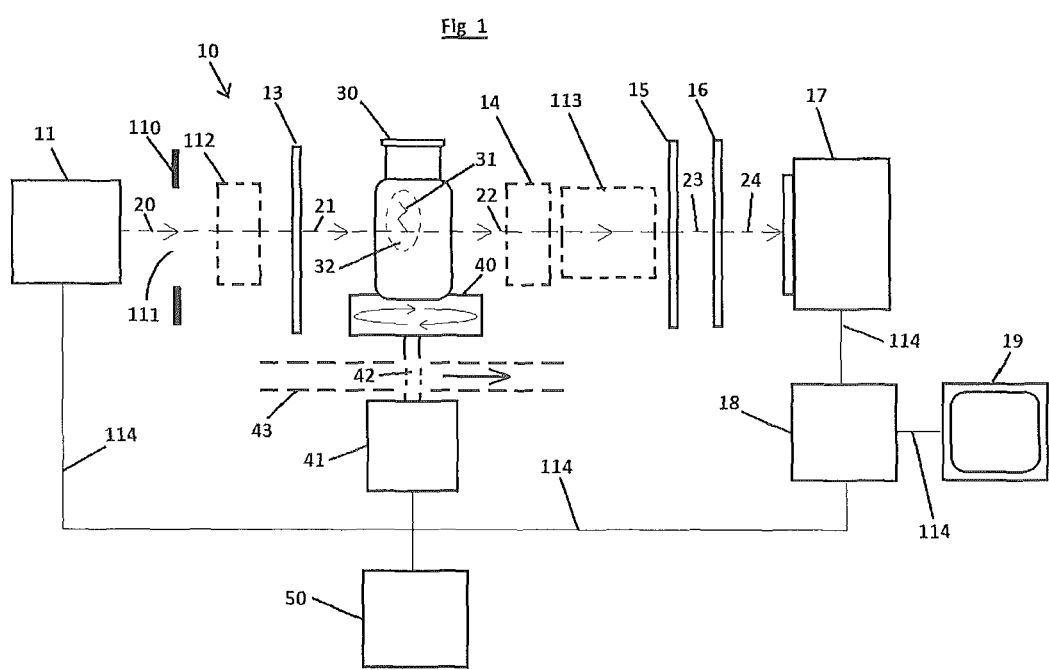
FIG. 1 shows the layout of an apparatus of the invention.

The apparatus of the invention preferably performs the method of the invention, and analogously the method of the invention is preferably performed using the apparatus of the invention. Consequently preferred features of the apparatus of the invention analogously correlate to preferred embodiments of the method of the invention.

The apparatus and method of the invention is found to address the problems mentioned above by providing good specificity of crack detection and a very low false reject rate relative to known state of the art systems, and being potentially able to achieving this at a rate commensurate with that at which containers such as vials, syringe barrels and ampoules are industrially made and/or filled as mentioned above.

The apparatus and method of this invention are particularly suitable for articles being transparent containers such as transparent vials, syringe barrels, ampoules and the like for medicinal products made for example of glass or transparent polymers such as polystyrene, polycarbonate and COC polymers. Such vials and syringe barrels are normally of a generally cylindrical shape, vials having a flanged neck which can be closed with a cap or stopper, and syringe barrels having a hub nozzle to which an injection needle can be fitted. Such vials and syringe barrels are susceptible to crack formation at all places in their structure, and stress resulting in birefringence may be transmitted from the immediate location of such cracks in the transparent material to other locations in the transparent material.

Preferably the apparatus and method of the invention is used with such vials or syringe barrels in an empty state, e.g. between manufacturing and filling. The apparatus and method may also be used with vials and syringe barrels in a filled state, provided the nature and/or quantity of the contents which have been filled into the vial or syringe barrel do not interfere with the passage of light through a region of the transparent material which is suspected to include a crack. For example clear liquid content e.g. aqueous solution content in such containers might not interfere with the method of the invention. Opaque content in such containers might in some situations interfere with the method of the invention, e.g. where such opaque content obscures a crack. However in other situations, e.g. where opaque content in a container obscures the immediate vicinity of a crack, but where the crack causes stress and resultant birefringence, to be transmitted to non-obscured parts of the transparent material of a container, such opaque content need not interfere with the method of the invention. Also rotation and/or other movement of the container on the mount as described below may move the contents of the container out of a position or orientation which interferes with the method of the invention.

In the apparatus of the invention the mount is preferably suitable to support one or more optically transparent article, e.g. a container such as the above-mentioned vial, syringe barrel or ampoule. Typically such containers are cylindrical. For example vials normally comprise a cylindrical body and a neck defining a mouth opening, generally with a shoulder in between the body and neck. Typically such a cylindrical container may be supported on the mount with its cylindrical axis perpendicular to the path of the light through the container. Suitably the mount is constructed to rotate the article supported thereon, e.g. around the cylindrical axis of such a mounted container, so that during a rotation the beam of incident light passes through the article along all radial directions around the rotation axis. This enables the incident light beam to pass through the entire cross section of the article so that a crack can be detected wherever it is located in the structure of the article.

Containers such as vials, syringe barrels and ampoules are typically manufactured and/or processed e.g. filled, at a high speed, typically up to 600 per minute (i.e. up to 36,000 an hour). Suitably the apparatus of the invention is constructed, and the method of the invention is operated to process articles such as vials or syringes at this speed. Suitable feed machinery to feed vials or syringe barrels to the apparatus or method of the invention will be apparent to those skilled in the art.

Therefore in an embodiment the apparatus further comprises a conveyor adapted to feed plural sequential containers to the apparatus of the present invention, to load the containers onto the mount of the apparatus of the invention, and to subsequently remove the containers from the mount(s) after the apparatus of the invention has operated, and then to convey the containers for further processing. For example such a conveyor may comprise a rotating carousel. Further processing may for example comprise filling, sealing, packing of the containers or incorporating them into other apparatus such as incorporating syringe barrels into syringes.

The light source is preferably a source of polychromatic white light. Such a light source may for example be a halogen lamp but preferably an LED is used, for example of power 5-10 W. An LED has among other things the advantage that it can be flashed, i.e. strobed, at an electronically controlled rate typically to produce light pulses of duration between 60-500 microseconds. By means of this flashing the emission of light from the LED can be synchronized for example with the feeding of an article onto the mount, and/or the position and/or rotation of the article supported on the mount so that light from the light source can scan the entire article and/or be associated with a specific position on an article, and so that a specific article in a stream of plural articles e.g. provided by the above-mentioned conveyor can be identified and associated with a detected crack. Preferably the light source is capable of emitting a highly directional beam of light.

Preferably the light source may be a so called coaxial (or on-axis) white LED. In a coaxial LED light source light emitted by an LED or LED array is reflected by a semi-transparent (half-silvered) mirror to align it along the optical path and which partly polarizes the emitted light. Such coaxial LEDs are commercially available.

The first polarizer and second (i.e. the so called "analyser") polarizer are suitably conventional commercially available polarizers. Preferably the first and second polarizers are highly achromatic, i.e. having minimal effect on the colour of light passing through them so as to cause minimal or ideally no modification of the light in the visible spectrum. Preferably the first and second polarizers are rotatable relative to each other and should be of a quality such that when crossed as near as possible complete opacity, i.e. blackness, is achieved with minimal residual blue or red being visible. Suitably the first polarizer is fixed and the second polarizer is mounted rotatably so that it can be rotated relative to the first polarizer for optimization of the formation of a coloured image and the consequent indication of the presence of a crack. The first and second polarizers are preferably mounted in a stress-free manner, e.g. sandwiched between holders in order to avoid any circular stress on glass that may later be detected as an offset.

The optical wave plate (also known technically as a retarder plate) is an optical device constructed of a birefringent material (such as quartz or mica) for which the index of refraction is different for different polarization orientations of light passing through it and that retards the wave phase of one of the orthogonally linear polarized components of light passing through it relative to the other orthogonal component by a wavelength or proportion of a wavelength. By appropriate choice or combination of the wave plate(s) it is possible to introduce a controlled phase shift between the two polarization components of light.

Common types of wave plate are the half-wave plate which retards the wave phase by half a wavelength, and the quarter-wave plate which converts linearly polarized light into circularly polarized light and vice versa.

In the apparatus and method of the invention a so-called "full wave plate" (also known as a red plate, red-I (red-one) plate, lambda ($\lambda$) plate, gypsum plate, selenite plate, sensitive violet, or simply a color tint plate) is preferably used. Such a full wave plate adds a fixed optical path difference, typically between 530 and 560 nanometers i.e. in the green region of the visible spectrum (depending upon the manufacturer) to every wavefront in its field when its birefringent retardation material is illuminated by linearly polarized light at a 45-degree incident angle to the index ellipsoid. As a result, wavelengths in this retardation range emerge from the full wave plate still linearly polarized and having the same orientation as when they entered the full wave plate. These wavelengths, when perpendicular to the polarization direction of the second polarizer (analyzer), are consequently absorbed and do not pass through. The orthogonal wavefronts of all other wavelengths will experience some degree of retardation (less than a full wavelength) and will emerge from the retardation plate having varying degrees of elliptical polarization. These wavefronts are therefore able to pass a component vector through the second polarizer (analyzer). Subtracting the green wavelengths from white light yields bright magenta-red resulting from a combination of all visible light spectral colors when the green wavelength band is missing. Inserting a first order retardation plate into the optical path of polarized light introduces an enhanced display of interference colors in thin, birefringent specimens. A full wave plate can also be efficient at increasing contrast in very weakly birefringent specimens that are difficult or impossible to detect using crossed polarized illumination alone. Full wave plates are commercially available, such as the Olympus™ U-TP530.

It has been found that the use of a full wave plate provides much better crack detection than that achieved by the use of a quarter wave plate, or half wave plate. It has also been found that locating the wave plate, and in particular the full wave plate, so that light from the light source passes through the article before it passes through the wave plate, provides better crack detection than when the full wave plate is located so that light from the light source passes through the wave plate before it passes through the article. In particular, it has been found that crack detection is improved when the full wave plate is located between the article and the second polarizer, as compared with crack detection achieved with the full wave plate located between the first polarizer and the article.

Preferably the wave plate, e.g. the full wave plate, is mounted rotatably so that it can be rotated relative to the first and second polarizer.

The optical detector may for example comprise an otherwise conventional electronic camera, e.g. with a colour CCD or CMOS or alternative sensor. This may be a commercially available camera but in the apparatus and method of this invention some commercially available cameras may benefit from removal of the protective filter lens on the sensor surface. Such a camera is primarily designed to capture a visible image and the use of a full wave plate as described above can enhance the visible image captured by enhancing the red and blue ends of the spectrum of the captured image, and hence the contrast between them. Such a camera should be capable of generating an electronic signal, e.g. a pixilated signal, corresponding to light received having passed through the second polarizer.

The image processing system may be a conventional digital processing system able to process the electronic signal generated by the optical detector such as an electronic camera in response the received light to thereby generate an indication to a user of the presence or absence of a crack in the transparent article. The image processing system may for example be a computer. Suitable software is commercially available and will be apparent to those skilled in the art, for example Zeiss Axiovision 4.6 or later versions, Seidenader SVObserver 5.01 or later versions. The image processing system may for example generate a visual indication of the presence of a crack in the transparent article, for example displayed on a screen visible to a human viewer, and/or the image processing system may be adapted to further process the electronic signal and indicate the presence of a crack in the transparent article by for example an electronic, audible or visual warning.

The image processing system may be connected to a control system, preferably an electronic processing system, controlling an operation involving one or more transparent article, such as containers, and adapted to halt the operation relating to the transparent article, or to divert the transparent article from such an operation to for example a reject location if there is an indication of a crack in the article. For example such an operation may be a vial, syringe barrel or ampoule manufacturing, filling or packaging operation. For example such a control system may be operatively connected to the above-described conveyor to carry this out.

It is particularly preferred that the image processing system applies a process of decomposition and binarization of image channels to the electronic signal generated by an optical detector such as an electronic camera. In this process one or more threshold level is set for a value in the signal generated by the light detected by the optical detector. For example such a value may relate to colour, e.g. red, green, blue, hue, saturation or intensity, or one or more other property of the image. In the binarization stage the signal is processed to enhance the contrast between signals above and below such a threshold, for example at the respective red and blue ends of the optical spectrum, especially if the red-blue contrast is also enhanced by the use of the above-described full wave plate. In this way a relatively small difference in the value which for example may be invisible to the human eye, may be made visible e.g. as a false colour image, or further processed electronically.

The apparatus of this invention may also incorporate one or more optical element to direct, e.g. guide, light from the light source through the polarizers, wave plate and transparent article and to the detector. Such one or more light guide may for example comprise one or more mirror, optical fibre, lens, collimator such as a diaphragm having a collimating opening such as a slit, as conventional in the field of optics. Such a combination of optical elements may for example comprise a combination of one or more condenser lens and one or more dispersing lens located in the light path between the light source and the article. Such optical elements may for example contribute to the polarization of the incident light, for example unpolarized light from the light source can be polarized by reflection at an angle from a mirror with a dielectric surface, the reflected light being completely polarized by reflection at the so-called "Brewster's angle".

The method of this invention may be performed using an apparatus according to the invention. Elements and preferred embodiments of the method, e.g. the mount, light source, conveyor, first and second polarizers, wave plate, optical detector to detect an image caused by birefringence resulting from stress in the transparent material in polarized light which has passed through the second polarizer and generating an electronic signal responsive to the image, image processing system to provide an indication to a user of the presence or absence of a crack in the transparent article, processing speed corresponding to the typical manufacturing and/or processing e.g. filling speed of containers such as vials, syringe barrels and ampoules, are consequently analogous to the elements and preferred embodiments of the apparatus described herein.

The method of the invention is preferably used for the detection of cracks in transparent articles which are vials, syringe barrels or ampoules made of glass.

In the method of the invention, stress may appear and be detected as described adjacent to or associated with any part or all of the length of a crack. However if a crack has formed to relieve stress, then residual stress in the material may be concentrated at one or both ends of a crack. Consequently the apparatus and method of the invention may in practice detect primarily one or more end of a crack, and provide an indication of the presence of a crack by detection of stress associated with such end(s) of a crack.

The method of the invention appears to be suitable for detection of cracks in the transparent cylindrical walls of containers, and also in regions of other geometries, e.g. where the transparent material bends or folds e.g. about the shoulders of vials where the vial body meets the neck, and where the neck of a vial bends to form the flange surrounding the mouth opening of a vial.

EXAMPLE OF THE INVENTION

Referring to the drawings, FIG. 1 shows the optical arrangement of an apparatus 10 (overall) of this invention suitable for performing the method of this invention.

The apparatus 10 comprises a light source 11 positioned to direct a beam of incident light 20 toward an article being a conventional generally cylindrical vial 30 made of transparent glass and supported on a mount 40.

The light source 11 is a coaxial white light-emitting LED (Keyence™ CA-DX) white LED of power 5-10 W able to emit a unidirectional beam 20 of polychromatic white light when actuated. The internal semi-transparent mirror (not shown) of the coaxial LED aligns and partly polarizes the emitted light 20. The LED light source 11 is capable of being flashed electronically, i.e. to strobe, at a controllable rate to produce light pulses of duration between 60-500, especially 60-130 microseconds.

A first polarizer 13, being an Edmund Optics™ 25 mm glass linear polarizer (Edmunds Optics™ ref. #47-216) operative in the visible range with high achromatic extinction is positioned such that the light beam 20 from light source 11 can pass through first polariser 13 and thereby becomes linearly polarized. The first polarizer 13 may be rotated around the axis of the light 20 to optimize the sensitivity of the apparatus 10.

Vial 30 is positioned on mount 40 such that the light beam 21 now polarized by passing through first polarizer 13 then passes through the vial 30 supported on mount 40. In the apparatus 10 a typical distance between the Edmund Optics™ 25 mm glass linear first polarizer 13 and the vial 30 may be 20 to 50 mm range. The optimal distances for different types of first polarizer 13 may differ from this but may be determined experimentally.

The mount 40 is rotationally drivable by servo motor 41, and the vial 30 is mounted on mount 40 such that that the vial 30 supported thereby may be rotated about its cylindrical axis. A syringe barrel or ampoule may be mounted analogously.

The mount 40 is itself mounted on a rotating carousel shown schematically 43 by means of which plural vials 30 may be sequentially moved into the position shown in FIG. 1, a vial 30 maintained in that position for long enough for the method of the invention to be applied to that vial, and thereafter the vial 30 may be moved away either for further processing e.g. filling, labeling etc., or rejection if a crack is detected as described below. Such a conveyor 43 may for example be constructed such that vials 30 supported on mounts 40 may be conveyed at a typical manufacturing and/or processing speed of e.g. ca. 600 units/min, and may be maintained in the position shown in FIG. 1 for a time long enough for the method of the invention to be applied to that vial by the apparatus. This time, and the rotation speed of the mount 40 may be set experimentally, for example related to the pulse (strobing) speed of the light source 11, and for example related to the number of images of the vial required during a full rotation of vial 30.

The wave plate 15 is a full wave plate, being an Olympus first order (microscope first order full wave U-TP530) retardation plate which retards one of the orthogonally linear polarized components of light 23 which has passed through wave plate 15 by a full wavelength relative to the other orthogonally linear polarized component. The Full wave plate 15 is rotatable around the axis of light beam 22 passing through it relative to first polarizer 13 to empirically adjust the sensitivity of the apparatus 10.

A second polarizer 16, also being an Edmund Optics 25 mm glass linear polarizer (Edmunds Optics ref. #47-216) operative in the visible range with high achromatic extinction, is positioned such that light 23 which has passed through the full wave plate 15 may then pass through polarizer 16. Second polarizer 16 is rotatable on the axis of the light beam 23 relative to first polarizer 13 to adjust the sensitivity of the apparatus 10. A suitable relative rotation alignment of the first 13 and second 16 polarizers may be determined empirically. A typical distance between the full wave plate 15 and the second polarizer 16 may be 20 mm or less.

An optical colour detector is provided by camera 17, being a commercially available Basler™ A311FC or Zeiss™ HRc modified by removal of any protective glass lens on the CCD or CMOS sensor to inactivate any band pass filter. Preferably the objective lens of camera 17 is of short focal length, typically 16-35 mm, for example with a C mount. A 1 mm to 10 mm extension tube may be used to further reduce the focal length of the objective. Alternatively a macro objective Apo Rodagon™ 50 mm lens with a focusing ring was used to avoid any vignetting effect, i.e. a reduction of the brightness or saturation of the detected image at the periphery compared to the image centre. The objective of the camera 17 is positioned at ca. 100 mm from second polarizer 16 (distance may be adjusted in function to objective focal length and aperture) to detect light 25 which has passed through second polarizer 16, and camera 17 generates an electronic signal corresponding to light which has passed through the second polarizer 16. With the Apo Rodagon 50 mm lens a typical distance used between vial 30 and full wave plate 15 was 350 mm, but this distance may be reduced with a shorter focal length objective (16 mm).

Camera 17 is electronically connected to image processing system 18 being a computer provided with appropriate software, and which is electronically connected to display 19.

The apparatus 10 optionally includes generally conventional light guide elements. In FIG. 1 these optional elements are shown in hatched outline. These optional elements comprise the following. An optional diaphragm 110 incorporating a collimating slit 111 being an Iris diaphragm from Edmund Optic may be positioned such that the reflected light beam 21 from light source 11 passes through the slit 111, setting the width of light beam 21 to a width suitable to illuminate the entire vial 30. An optional condenser lens 112 being an Edmund Optics aspherical 50-75 mm chromatic collimating lens may be positioned to focus the light 21 from light source 11 toward the glass vial 30. An optional condenser lens 14, for example an Edmund Optics achromatic 50 mm to 75 mm focal length lens may be located between the vial 30 and full wave plate 15 to focus the light beam 23 toward camera 17. A typical distance between the vial 30 and such a collimating condenser lens 14 may be 50 mm range.

The apparatus 10 optionally includes a generally conventional optical mirror system shown schematically 113 typically incorporating mirrors positioned at 45° to the direction of the light beam 22 to enable the apparatus to be made more compact for integration in an industrial machine where linear space is limited. For best performance, it is better to avoid these mirrors and to use short focal range optics (e.g. a 16 mm wide angle objective on camera 17).

The apparatus 10 functions as below to perform the method of the invention. White 20 light emitted from the LED light source 11, aligned and partly polarized by the internal mirror of the coaxial light source 11 is collimated by aperture 111 and focused by lens 112 which guides the focused light 20 in a directional beam of a width sufficient to illuminate the entire vial 30 through first polarizer 13 from which the light beam 21 emerges from first polarizer 13 fully linearly polarized. This beam 21 of linear polarized light then passes through transparent vial 30, while vial 30 and mount 40 are rotated by servo motor 41 via drive shaft 42. The rotation speed of the servo motor 41, and correspondingly the strobing flashing rate of the light source 11 may be adjusted so that for example from one to several thousand images derived from the vial 30 may be generated by camera 17, in effect freezing the rotational motion of vial 30. In practice the servo motor 41 was capable of rotating the mount 40 and a vial 30 thereon at up to 4000 rpm.

In the transparent material of the vial 30 is a crack 31. A crack in a transparent amorphous material such as the glass the vial 30 is made of is often surrounded by a region of residual stress in the transparent material. In the subject vial 30 the crack 31 is surrounded by an area of residual stress 32, and such residual stress may be transmitted to other areas of the transparent material. Stress in the area 32 causes the transparent material to become birefringent. The birefringence of the stressed area 32 causes the linearly polarized light 21 from first polarizer 13 to be resolved into two orthogonally polarized components aligned in a direction dependant on the direction of anisotropy introduced into the transparent material of vial 30 by the stress resulting from the crack 31, and also causes the wave phase of one of these two polarized components to be retarded relative to the other in the light 22 which has passed through vial 30.

Light 22 which has passed through the transparent material of vial 30 including the stress-induced birefringent transparent region 32 adjacent to crack 31 then passes through full wave retarder full wave plate 15 which further retards one of the orthogonally polarized components of the light 24 by one wavelength. This light 22 may be focused by optional lens 14 situated between the vial m30 and wave plate 15. The light 23 emerging from full wave plate 15 then passes through the second polarizer (analyzer) 16, the direction of polarization of which is rotated at an angle around the direction the light beam is traveling relative to that of the first polariser 13. The relative retardation of the wave phases of the light beam 23 causes interference, either constructive or destructive, between the wave phases and an image formed of a spectrum of visible colours is formed in the light 24 which has passed through the second polarizer 16. The passage of the light 23 through the full wave retarder wave plate 15 enhances the phase shift from the retardation and sharpens the spectrum of colours by enhancing the contrast between the red and blue ends of the spectrum. The result is a visible or otherwise optically detectable pattern of colour in the light 24 entering camera 17 which that shows up the strain patterns in the stressed region 32 caused by the crack 31 in vial 30. The second polarizer (analyzer) 16 and/or the full wave plate 15 may be rotated and fixed relative to the first polarizer 13 about a rotation axis centered on the direction of the beam of light 20-24 during the method to achieve for example optimized intensity, clarity and contrast of the observed colour patterns.

This colour pattern in the light 24 is detected by the electronic camera 17 and is electronically processed by the image processing system 18 which applies a process of decomposition of the colour image into six channels based on red, green, blue, hue, saturation and intensity, followed by binarization in which threshold levels for the red, blue and green colour channels are set, and optionally also for hue, saturation and intensity, and the processed image is then displayed on display 19.

The image processing system 18 is also connected to the control system 50 which is set up to control the overall operation of the apparatus 10 via data connections 114. For example control system 50 can control the stroboscopic flashing of light source 11 as the vial 30 is rotated on mount 40 so that the beam of light 20 can be scanned through sequential rotational positions of vial 30 as it rotates on the mount 40 and the camera 17 can be set to observe the colour image formed at each of these sequential rotation positions. In another mode of operation the light source 11 can be set to flash at a rate synchronized with the rate at which successive vials 30 are loaded onto the mount 40 so that an image of a single whole vial 30 is generated with each flash of the light source 11. Other modes of operation will be apparent to those skilled in the art, depending upon the specific application for which the apparatus and method are being used.

Figure 2:
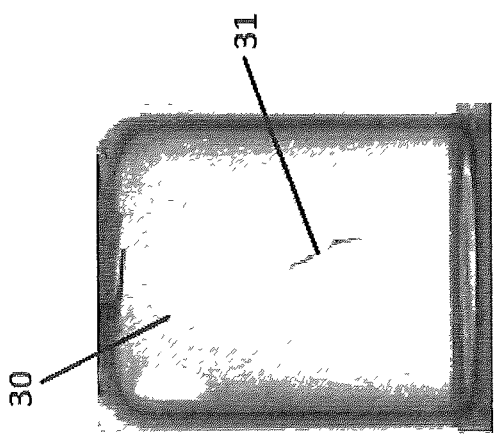
FIG. 2 is a photograph of a transparent glass vial in which there is a crack.

FIGS. 2-7 illustrate the effectiveness of the method of this invention. FIG. 2 shows a typical glass pharmaceutical vial 30 of capacity ca. 3 ml (other vial volumes may be used) with a crack 31 in its transparent material. Crack 31 is shown aligned generally vertically in the vial open top—closed base direction, but could be aligned in other orientations or be located at other positions (i.e. in the neck or crimping region) on the vial 30. Crack 31 has a length of ca. 6 mm and spanning ca. 2.5 mm around the circumference of the vial.

Figure 3:
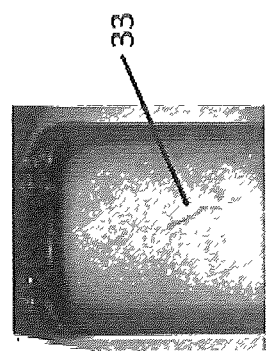
FIG. 3 shows a raw image of coloured stress patterns in the glass of the vial of FIG. 2 without any image processing.

FIG. 3 shows in black and white the colour image as detected by the camera 17, processed by image processing system 18 and displayed on the display 19 without any binarization of the image, i.e. showing the image contrast levels as seen with the naked eye. The image is an overall blue colour and shows an area of a slightly, but visible, brighter blue colour 33 representing the area of stress 32 adjacent the crack 31 thereby giving an indication of the presence of the crack 31 and indicating the position of the crack 31 on the vial 30.

Figure 4:
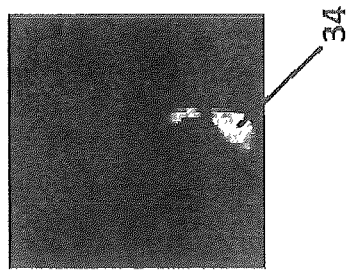
FIG. 4 shows a black and white representation of the image of coloured stress patterns of FIG. 3 when enhanced using image processing by colour decomposition.

FIG. 4 shows the image as detected by the camera 17 and displayed on the display 19 after decomposition of the colour image into six channels based on red, green, blue, hue, saturation and intensity, followed by binarization of the image by the image processing system 18. As seen in FIG. 4 the areas of the image with an intensity below the thresholds set for one or more of these channels are displayed in a synthetic false colour image, significantly enhancing the visible contrast in the displayed image. Additionally or alternatively the control system 50 can be set to respond to an electronic signal derived from the image processed by the image processing system 18, to control a further operation (not shown) performed on the vial 30.

Figure 5:
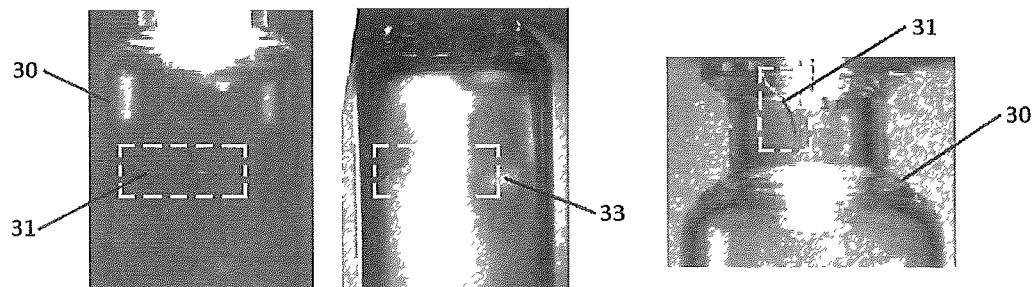
FIG. 5 shows a cracked vial and the corresponding image as detected by the apparatus and method of the invention.

FIG. 5 left picture shows a vial 30 with a visually conspicuous crack 31 ca. 8 mm long in its glass wall (outlined to indicate its position). FIG. 5 right picture shows the corresponding image as detected by the camera 17 and displayed on the display 19 after decomposition of the colour image into six channels based on red, green, blue, hue, saturation and intensity, followed by binarization of the image by the image processing system 18. As shown in FIG. 5 right picture an intense red patch corresponding to the position of the end of the crack 31 and the surrounding region of induced stress in the glass around appears in the image, contrasting strongly with adjacent areas of blue. The red-blue contrast is believed to be a result of the enhanced red and blue ends of the spectrum provided by the full wave plate.

Figure 6:
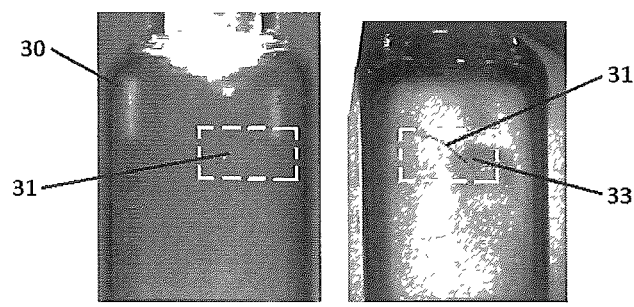
FIG. 6 shows a cracked vial and the corresponding image as detected by the apparatus and method of the invention.

FIG. 6 left picture shows a vial 30 with a crack 31 which is less visually conspicuous than that of FIG. 5, ca. 5 mm long in its glass wall (outlined to indicate its position). FIG. 6 right picture, obtained by means of the same procedure as that of FIG. 5 shows the corresponding image as detected by the camera 17. As shown in FIG. 6 right picture an intense red patch corresponding to the position of the end of the crack 31 and the surrounding region of induced stress in the glass around appears in the image, contrasting strongly with adjacent areas of blue.

Figure 7:
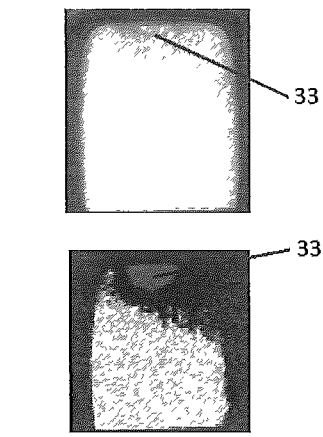
FIG. 7 shows a vial with a crack in its neck region and the corresponding image as detected by the apparatus and method of the invention.

FIG. 7 upper picture shows a vial 30 with a crack 31 in its neck region below the flange surrounding its mouth opening and spanning the bend in the glass where the neck region merges with the flange. FIG. 7 middle picture, shows an image obtained by means of the same procedure as that of FIG. 5. As seen in FIG. 7 middle picture a pink patch corresponding to the position of the end of the crack 31 in the neck of the vial 30 and the surrounding region of induced stress in the glass around appears in the image, contrasting with adjacent areas of blue. In the lower picture of FIG. 7 electronic image processing has been applied to further enhance the contrast in the image between the area of stress resulting from the crack 31 and the surrounding glass of the vial 31.

The method of the invention has been tested with leaking cracks 31 in the walls of conventional glass vials having a leak size as small as $1.3 \times 10^{-7}$ Mbar·L·s$^{-1}$ leak rate in a helium tester or 0.58 μm pinhole equivalent and was found suitable for detecting these cracks.

What is claimed is:

1. An apparatus for detecting a crack in an article that is transparent to polychromatic white light, the apparatus comprising: a mount to support said article; an LED source of polychromatic white light which can be flashed at an electronically controlled rate to produce light pulses of duration between 60-500 microseconds, positioned to direct a beam of incident light at an article supported on the mount; an optical detector positioned to receive light from the light source which has passed through said article supported on the mount, and to generate an electronic signal responsive to such received light; a first polarizer positioned between the light source and the mount such that incident light from the light source passes through the first polarizer on its path to said article supported by the mount; a second polarizer positioned between the mount and the optical detector such that incident light from the light source which has passed through the first polarizer and said article supported by the mount passes through the second polarizer on its path to the optical detector; an optical wave plate positioned between the mount and the second polarizer such that incident light from the light source which has passed through the first polarizer and said article supported by the mount passes through the wave plate on its path to the second polarizer and the optical detector; an image processor to process electronic signal generated by the optical detector in response to light received by the optical detector and to thereby generate an indication to a user of a crack in said article supported on the mount, wherein the wave plate is a full wave plate and said light incident on said full wave plate is linearly polarized light, said full wave plate comprising birefringent retardation material, and wherein illumination of said birefringent retardation material by said linearly polarized light at a 45-degree incident angle to the index ellipsoid adds an optical path difference in the green region of said polychromatic white light to every wavefront in its field.

2. An apparatus according to claim 1 wherein the mount is suitable to support an article selected from a vial, a syringe barrel, and an ampoule, and the mount is constructed to rotate said article.

3. An apparatus according to claim 1 wherein the wave plate is mounted rotatably so that it can be rotated relative to the first and second polarizer.

4. An apparatus according to claim 1 wherein the image processing system (a) generates a visual indication of a crack in the article, or (h) further processes the electronic signal and indicates a crack in the article by an electronic, audible or visual warning.

5. An apparatus according to claim 4 wherein the image processing system is connected to a control system controlling an operation involving the article, said control system adapted to halt the operation relating to the article, or to divert the article from such an operation.

6. An apparatus according to claim 1 wherein the image processing system applies a process of decomposition and binarization of image channels to the electronic signal generated by the optical detector.

7. An apparatus according to claim 6 wherein the process of decomposition and binarization of the signal generated by the light detected by the optical detector relates to colour, saturation or intensity.

8. An apparatus according to claim 7 wherein the process of decomposition and binarization of the signal generated by the light detected by the optical detector enhances red-blue contrast of said detected light.

9. An apparatus according to claim 1 wherein the apparatus further comprises a conveyor adapted to (a) sequentially feed a plurality of articles to the apparatus, (b) load the articles onto the mount of the apparatus, and (c) remove the articles from the mount.

10. A method for checking an article for the presence of a crack comprising:
supporting an article on a mount, where said article is optically transparent to polychromatic white light;
directing incident light from an LED source of polychromatic white light flashed at an electronically controlled rate to produce light pulses of duration between 60-500 microseconds through a first polarizer positioned between the light source and the article such that the incident light from the light source becomes polarized light;
passing said polarized light through the article;
passing said polarized light which has passed through the article through a wave plate;
passing said polarized light which has passed through the wave plate through a second polarizer;
using an optical detector to detect an image caused by birefringence resulting from stress in the article in said polarized light which has passed through the second polarizer;
generating an electronic signal responsive to the image;
using an image processor to process the electronic signal related to the image to provide an indication to a user of a crack in the transparent article,
wherein the wave plate is a full wave plate and said light incident on said full wave plate is linearly polarized light, said full wave plate comprising birefringent retardation material, and wherein illumination of said birefringent retardation material by said linearly polarized light at a 45-degree incident angle to the index ellipsoid adds an optical path difference in the green region of said polychromatic white light to every wavefront in its field.

11. A method according to claim 10 wherein the article is selected from a vial, a syringe barrel, and an ampoule.

12. A method according to claim 10, wherein said birefringence resulting from stress in the article is associated with an end of a crack in the article.

13. A method according to claim 10 wherein said article is a glass vial and cracks are detected having a leak size above (a) $1.3 \times 10^{-7}$ Mbar·L·s$^{-1}$ leak rate in a helium tester or (b) 0.58 µm pinhole equivalent.

* * * * *